July 13, 1926.
G. M. ANDERSON ET AL
1,592,411
MEANS FOR PERIODICALLY DEPOSITING BISCUIT UPON A MOVING CONVEYER
Original Filed Sept. 7, 1922    6 Sheets-Sheet 2
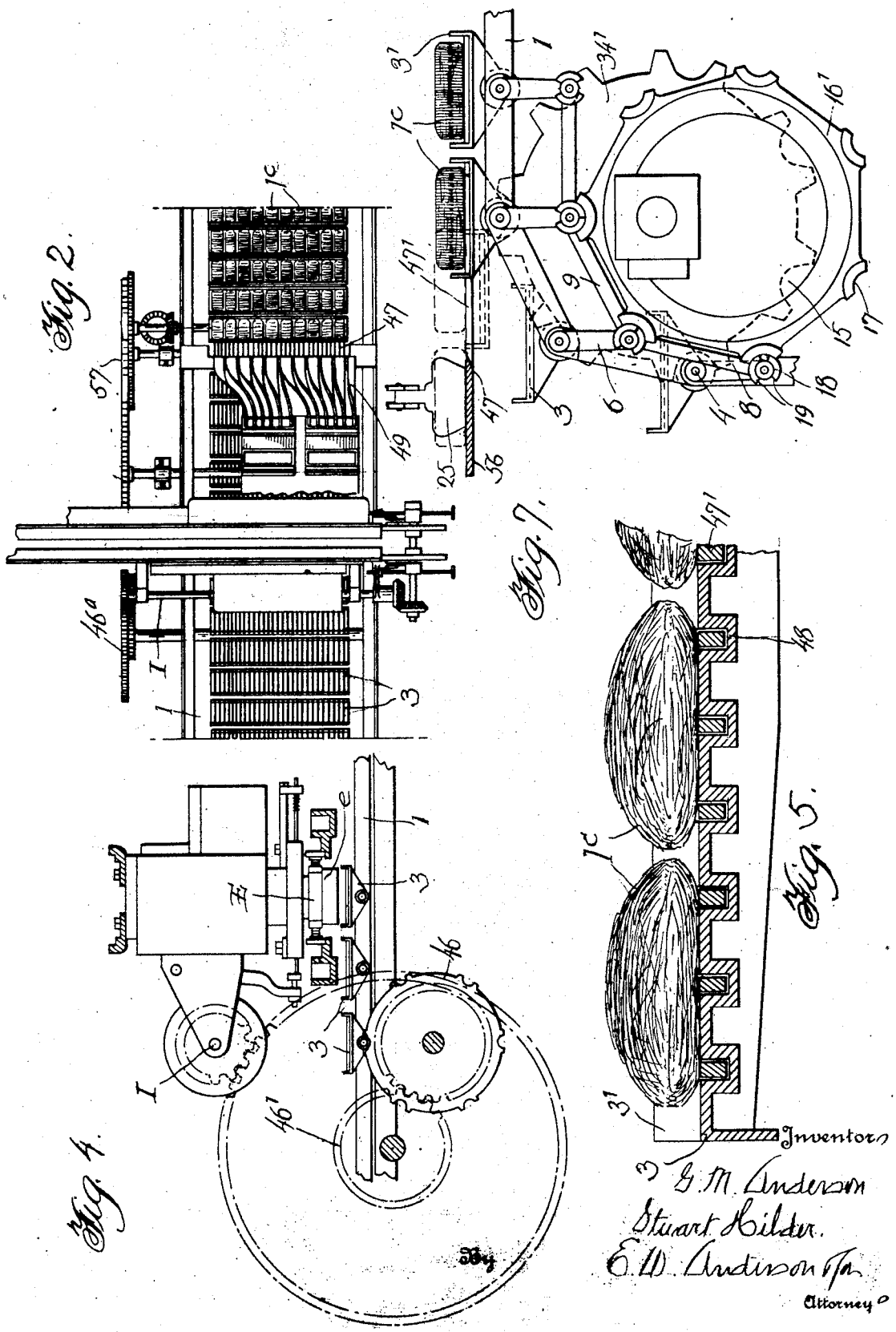

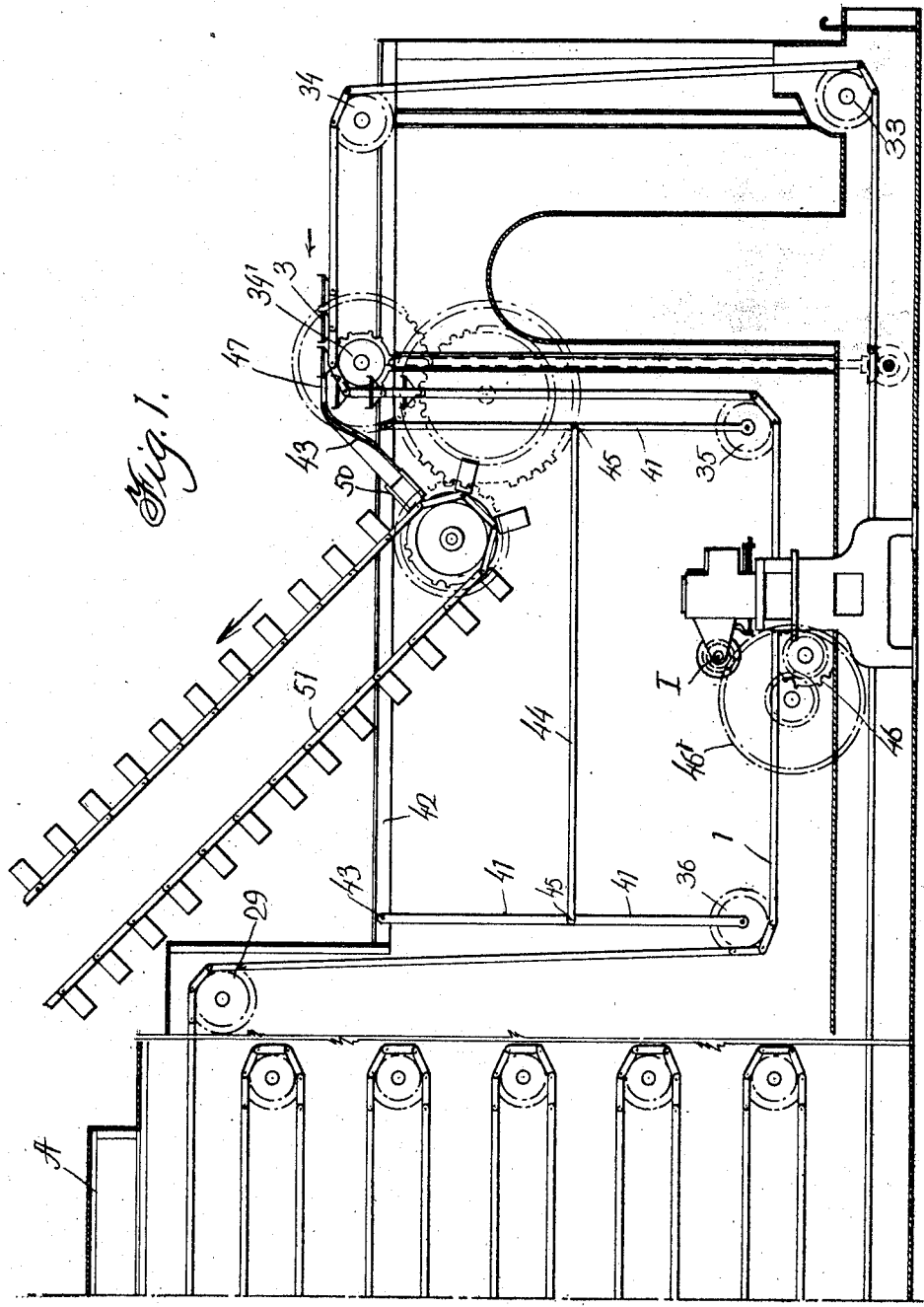

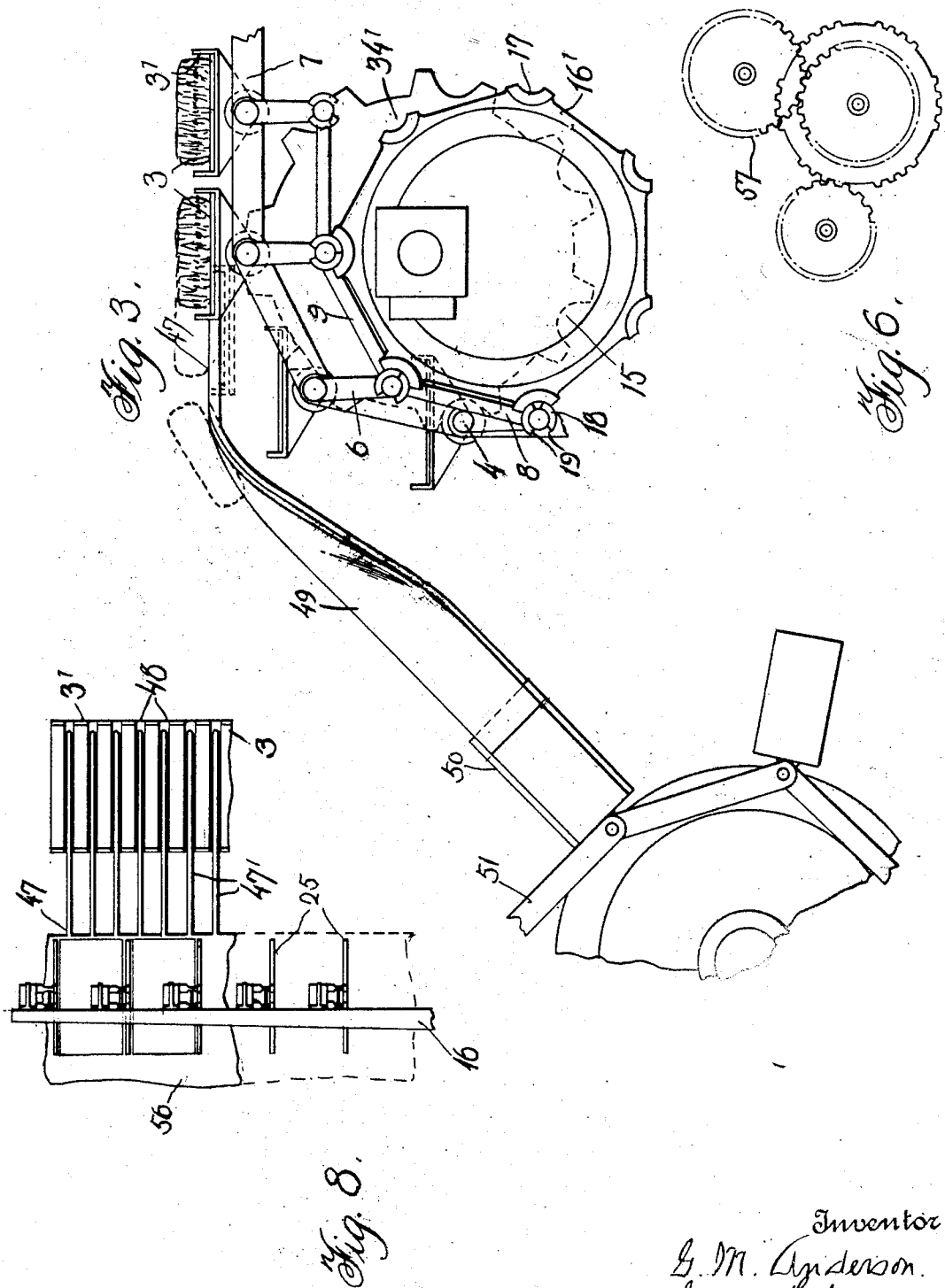

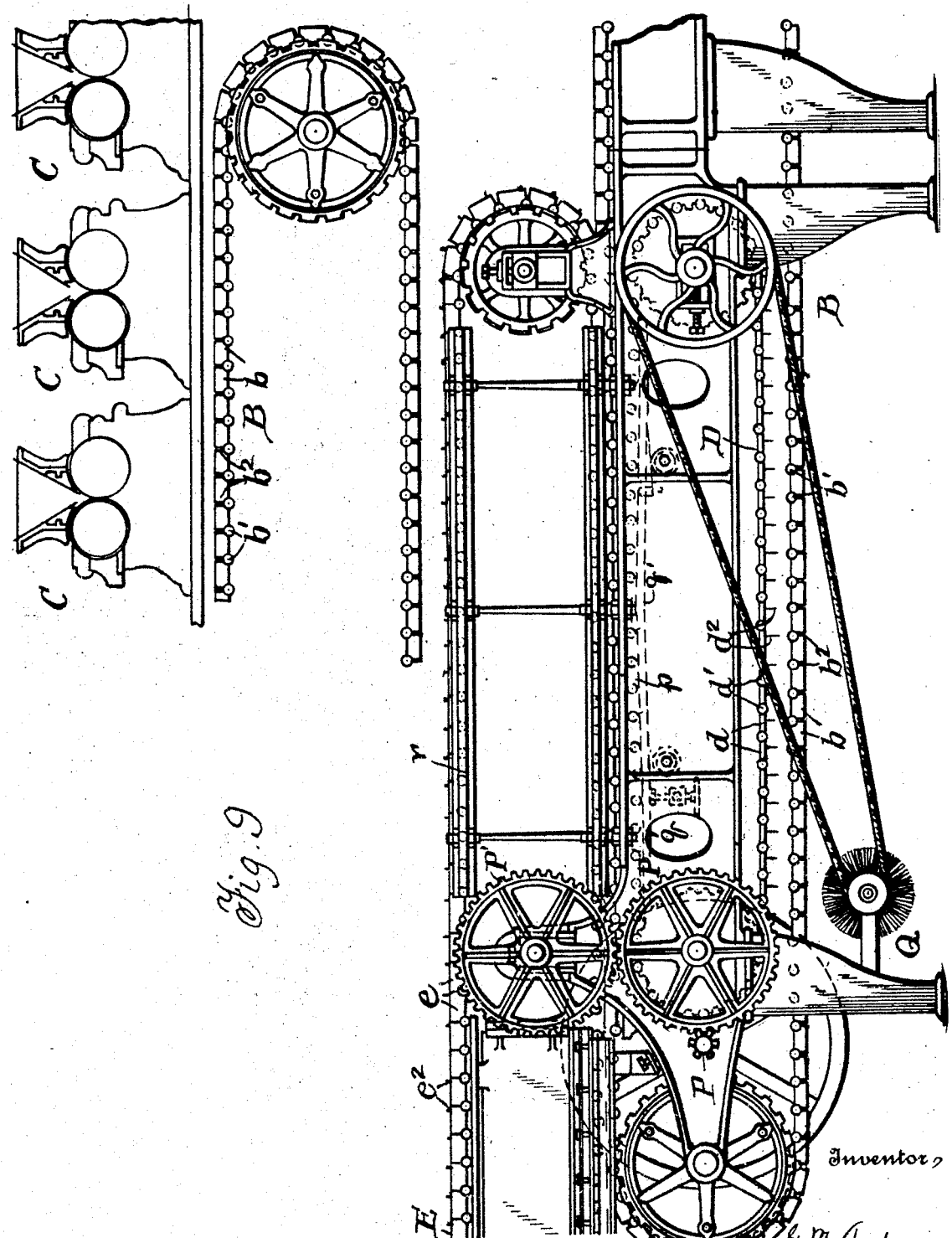

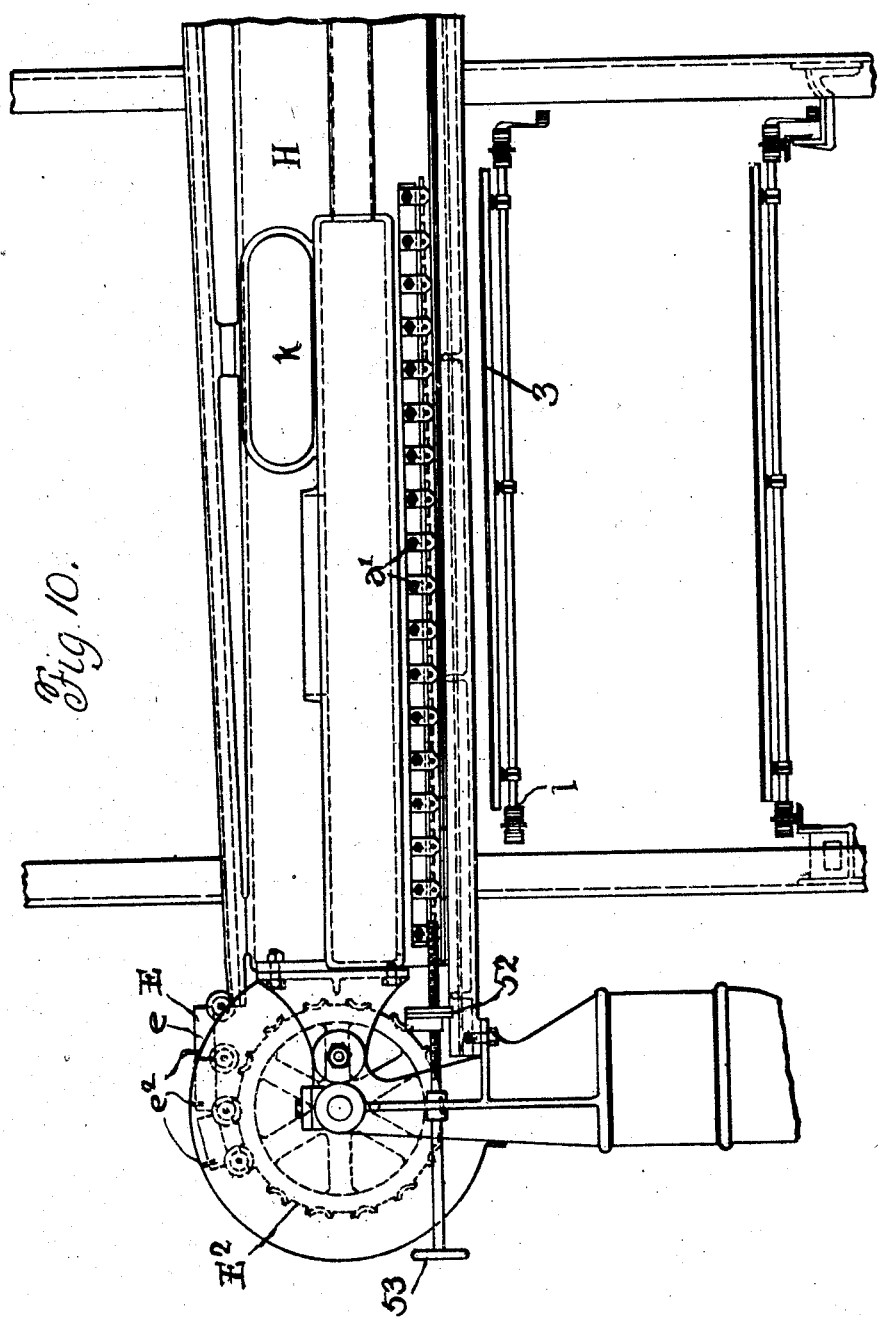

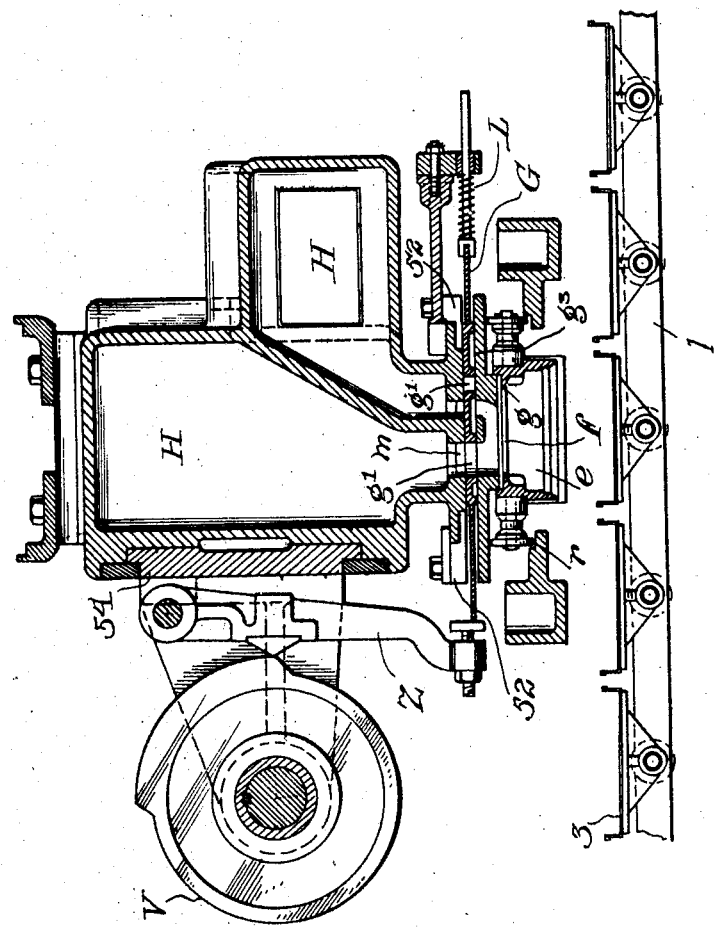

Patented July 13, 1926.

1,592,411

UNITED STATES PATENT OFFICE.

GEORGE M. ANDERSON, OF WASHINGTON, DISTRICT OF COLUMBIA, AND STUART HILDER, OF GLENCARLYN, VIRGINIA, ASSIGNORS TO THE SHREDDED WHEAT COMPANY, OF NIAGARA FALLS, NEW YORK, A CORPORATION OF NEW YORK.

MEANS FOR PERIODICALLY DEPOSITING BISCUIT UPON A MOVING CONVEYER.

Application filed September 7, 1922, Serial No. 586,705. Renewed February 2, 1926.

Figure 1 is a side view of the invention, partly in section, and partly broken away.

Figure 2 is a fragmentary top plan view of the invention, partly broken away.

Figure 3 is a fragmentary side view of the invention on a larger scale.

Figure 4 a fragmentary side view of another portion of the invention.

Figure 5 is a section on the line 5—5, Figure 8.

Figure 6 is a detail side view of a portion of the gearing.

Figure 7 is a fragmentary side view of a portion of the invention, similar to Figure 3, and showing a modified means for removing the biscuit.

Figure 8 is a fragmentary plan view of the same.

Figure 9 is a detail side view of the means for depositing the cereal band, and for dividing it into biscuit, parts being broken away.

Figure 10 is a similar view of the complementary portion of the machine shown in Figure 9 and showing the means for depositing the biscuit upon the oven conveyer.

Figure 11 is a section on the line A—A, Figure 10.

The invention has relation to means for manufacturing cereal filamentous biscuit, having for an object the provision of means for depositing cereal filamentous biscuit in the uncooked or green state upon a conveyer during the movement of the portion of the conveyer whereon the biscuit are deposited.

Other objects and advantages will hereinafter appear.

The invention consists in the novel construction and combinations of parts, as set forth in the appended claims.

In the accompanying drawings, illustrating an embodiment of the invention, the numeral 1 designates the oven conveyer whereon the biscuit are deposited from the links $e$ of the endless chain conveyer belt E of the depositing means diclosed in the copending application for patent of E. P. Webster, Serial No. 560,134, filed May 11, 1922; said oven conveyer carrying the biscuit thence passing into the oven and back and forth through the same for proper baking and drying, and passing out of the oven, all as in the aforesaid application; the same biscuit depositing means being used, but in connection with certain means to be disclosed for the purpose of coordinating or synchronizing the movement of the deposit conveyer E and the oven conveyer 1. The oven conveyer 1 is continuously driven by the same means as that disclosed in said application, the cam shaft I of the biscuit depositing means having gearing connection 46' with sprocket wheels 46 engaging the lower stretch of a looped portion of the oven conveyer 1.

Said chain as it passes out of the oven A is first extended horizontally for some distance, to sprocket wheel 33; thence upwardly to sprocket 34; thence horizontally to sprocket 34'; thence downwardly to sprocket 35; thence horizontally to sprocket 36 to form said lower stretch of the loop, and thence upwardly to sprocket wheel 29 to complete said loop, and into the oven. The loop formed in the conveyer chain as stated is suspended from the sprocket wheels 29 and 34, and the sprocket wheels 35 and 36, in the lower bends of the loop, are suspended from rods 41, depending from frame 42 and pivotally connected at their upper ends thereto at 43; each of the rods 41 having connection rod 44 pivotally connected thereto at 45; the result being that any movement imparted to the said loop will cause the suspension rods 41 to swing in parallel from points 43 as centers; the vertical stretches of the loop moving in parallel from the sprockets 29 and 34 as centers; the sprockets 35 and 36 in the lower bends of the loop moving in unison, and the distances between said upper and lower sprockets being maintained substantially constant throughout said movement, with some slight variation due to the fact that the center points 43 are not coincident with the sprocket wheels 29 and 34, from which the loop hangs.

The pans or trays 3 of the oven conveyer 1 will be properly registered with the links $e$ of the deposit conveyer E at the time of the fall of the biscuit from said links, brought about through the movement of the cam shaft I to open the valves G, by means of the sprockets 46; and the driving mechanism for the conveyer 1 and of the biscuit depositing means being as stated in the aforesaid application for patent, there will be at all times a regular and ordered registration of successive conveyer trays 3 with successive depositions of rows of biscuit from the links e of deposit conveyer E so that said biscuit will fall directly upon said trays, which latter may of course have some excess of width to provide for slight variations in the deposit of the biscuit thereon. In view of the fact that the deposit of each row of biscuit is instantaneous and the movement of the oven conveyer 1 is comparatively slow, the successive rows of biscuit will be properly and regularly deposited upon said trays brought successively in position under the links e of deposit conveyer E, without necessity for any stoppage of said oven conveyer.

In case there should be some variation in the speed of the oven conveyer 1, or of the lower stretch of the loop thereof, relative to the movement of the sprocket 46, the result will be that the loop in said conveyer 1 will swing to one direction or the other (depending upon whether the speed of said conveyer 1 is greater or lesser) but the trays 3 will still be moved in proper coordination with the depositing means, by the action of sprocket 46. Should the variation of speed continue, the lower stretch of said loop will be raised by the pivotal movement of the rods 41 sufficiently to escape from the sprocket 46 and miss a tooth thereof; whereupon said lower stretch of the loop will at once drop and engage said sprocket and the loop assume normal position. Inasmuch as the teeth of the sprockets 46 are spaced apart by distances corresponding to the distances by which said trays 3 are spaced apart, the trays will still register with said links e, following the slipping of a tooth of the sprocket just stated.

The biscuit having passed through the oven and drier and being now properly baked and dried, conveyer trays containing the baked biscuit are passed upwardly over the sprocket wheels 34 and horizontally to sprocket wheel 34'; and prior to the downward movement of said trays from sprocket 34', the teeth 47' of a stationary biscuit removal device or comb 47 will engage transverse grooves 48 of the bottoms of the trays 3, beneath the biscuit 1ᶜ in said trays, whereupon the trays will pass downwardly as the chain passes downwardly around the sprocket 34, away from and below said teeth, which will uphold the biscuit resting thereon. At the same time, the rear flanges or sides 3' of said trays will push the biscuit along the teeth of said comb, until said flanges pass below the tops of said teeth, from the position shown in full lines to the position shown in dotted lines in Figure 3. The succeeding tray 3, now coming along, its front flange 3' will engage the biscuit resting upon said teeth and will further push the biscuit along over said teeth; the entire movement of the biscuit row along said teeth by the push of both front and rear flanges of the tray being approximately the length of a biscuit and a half.

In this way, the removal means for the biscuit, being stationary, is not required to be timed with the movement or stoppage of the trays 3; the movement of the trays being taken advantage of to cause the removal of the biscuit therefrom, and with a minimum of disturbance or vibration of the delicate biscuit. The trays, being provided with grooves in their bottoms, will not be weakened, and as these recesses would not be more than $\frac{3}{16}$ of an inch in width, and the spaces between said grooves about ½ inch in width, there will be slight danger of any objectionable sinking of the soft material of the biscuit into said grooves prior to baking. The grooves 48 would be tapered at their front ends, as would also the points of the teeth 47', the latter being about 1/8 of an inch in thickness, so that proper engagement of the teeth with the grooves will be assured.

The movement of the biscuit pushed by the side flanges 3' from the conveyer trays upon the comb teeth is taken advantage of to push the biscuit upon spiral inclined ways 49, wherein the biscuit will descend through force of gravity and will be caused to assume parallel vertical position, from their previous parallel horizontal position, said ways being brought more nearly together as they extend downwardly, to thereby separate the biscuit into groups of a predetermined number of biscuit (five in the present case) to the group. The biscuit so separated into groups are delivered to separate open-top cartons 50, carried by conveyer 51, said conveyer preferably being inclined and passing upwardly to a floor above, where the cartons may be sealed.

Figures 3 and 7 of the drawings show a modified form of the invention, wherein the biscuit are pushed by the tray flanges 3' onto a platform 56, from which they may be removed by any suitable means, for instance by means of the rake device disclosed in the copending application for patent of E. P. Webster, Serial No. 571,825, filed June 29, 1922. This rake is designated by the numeral 16, and is provided with teeth 25.

The trays of the baking conveyer 1 are maintained in upright position by suitable means; for instance by the means shown in the application for patent of E. P. Webster, Serial No. 552,037, filed April 12, 1922. According to this construction the pivot rods 4 of the conveyer chain links are provided with depending crank extensions 6, the lower ends of which are offset to form the pivots of the links 8 of a supplementary sprocket chain 9, both chains being endless and of the same length over-all. The two chains, connected by the crank extensions 6, form a parallel movement chain couple, whereof the links move in parallel and the connecting crank extensions move in parallel.

The journal boxes of the sprocket wheel shafts are provided each with a depending eccentric 15, held stationary by the box and carrying a sprocket wheel or annulus 16' loose thereon, said eccentrics having their centers in the same vertical planes as the axial centers of the related shafts. The seats 17 of the sprockets 16' are engaged by end heads 18 of the links 8, said heads having angularly related radial shoulders 19, the shoulders of the adjacent heads of different links contacting with each other as the supplementary chain passes around a sprocket wheel 16'.

The sprocket wheels 16' serve as guide sprockets or idlers and, together with the action of the shoulders 19, are adapted to prevent any movement of the supplementary chain that would throw the conveyer trays 3 out of horizontal position, since said trays are rigidly mounted upon the rods 4.

The biscuits are deposited upon the baking conveyer by means now to be more particularly described.

The endless conveyer B is associated with upper and lower endless chain cutter belts E and D, having cutting devices working between the links of said conveyer in such manner as to divide the cereal band (laid down upon said conveyer by the reducing machines C) transversely into biscuit, the upper cutter belt E having the links thereof adapted to work in combination with pneumatic means for upholding the biscuit in the links of the lower stretch of the belt, after the biscuit have been carried to the limit of the conveyer B, the links of the endless chain belt E thereafter acting as part of a conveyer for the biscuit. The release of the vacuum or exhaust allows the biscuit to fall through force of gravity, whereby they are deposited from the links e of belt E upon the trays of the baking conveyer 1.

The conveyer B has links b and rollers b', traveling upon tracks p, said links being spaced at b². The lower cutter belt D has links d, cutter blades d² and rollers d', traveling upon tracks q, having a rise at q'. The upper cutter belt E has rollers e', traveling upon tracks r, and the links e thereof are provided with cutter blades e². The upper and lower cutter belts E and D are geared to move at the same rate of speed as the conveyer B.

The upper surfaces of the links e of the belt E move in approximate contact with the valve seats g, the valve plates G working in seats q³ of the framing in the lower part of chamber H, said valve plates being provided with air passages g' and with solid portions g², adapted to register alternately with the openings leading to the pneumatic or suction chamber H to control the exhaust. The suction links e of the belt E are each provided with an opening f, communicating with passage f' through the link, the lower part of said passage being covered by wire cloth a. Cams V upon the shaft I operate the arms Z, and thereby actuate the valve plates G against the tension of retraction springs L. The passage k leads to an exhaust fan, and if desired a pressure or blowing chamber H' may be used, having connection with a suitable blower. The slide 52 and the valve plates G carried thereby are adjustable by screws 53 at each side of the machine, this adjustment being followed by adjustment of slide 54 (carrying cams V, arms Z, etc.,) by means of screw 55.

The aforesaid means for depositing the biscuit upon the baking conveyer 1 are more fully disclosed in the patent to Perky, No. 678,625, dated July 16, 1901, and in said application for patent Serial No. 560,134, filed May 11, 1922, and the disclosures of which are made a part of this application, should such be needed.

The conveyer 51 is shown as driven by intermittent gearing 57 having operative connection with the drive of conveyer 1, but any other suitable driving means may be employed.

We claim:

1. In a machine for the purpose described, a conveyer including trays, driving means therefor, means for depositing biscuit upon said conveyer, means for operating the depositing means, and means driven by said operating means and operating independently of the driving means of the conveyer to assure registration of said trays successively with said depositing means simultaneously with the operation of the latter.

2. In a machine for the purpose described, a conveyer including trays, driving means therefor, means for depositing biscuit upon said conveyer, means for operating the depositing means, and means including a member driven by said operating means, engaging the conveyer and operating independently thereof to assure registration of said trays successively with said depositing means simultaneously with the operation of the latter.

3. In a machine for the purpose described, a conveyer including trays, driving means therefor, a portion of said conveyer being adapted for movement independent of its driving means, means for depositing biscuit upon said conveyer, means for operating the depositing means, and means driven by said operating means and engaging the independently movable portion for assuring registration of said trays successively with said depositing means simultaneously with the operation of the latter.

4. In a machine for the purpose described, a chain conveyer, trays mounted thereon, driving means therefor, a portion of said conveyer being adapted for movement independent of its driving means, means for depositing biscuit upon said conveyer, means for operating the depositing means, and means including a sprocket driven by said operating means and engaging said independently movable portion for assuring registration of said trays successively with said depositing means simultaneously with the operation of the latter.

5. In a machine for the purpose described, a chain conveyer having a portion movable over sprockets mounted in a pivoted frame, trays mounted on said conveyer, means for depositing biscuit upon said conveyer, means for periodically operating the depositing means, and means including a sprocket driven by said operating means and engaging the pivotally carried portion of said conveyer for assuring registration of said trays successively with said depositing means simultaneously with the operation of the latter.

6. In a machine for the purpose described, a conveyer, driving means therefor, a second conveyer including trays, driving means therefor, means for removing biscuit from said first named conveyer and depositing the same upon said second conveyer, means timed with the drive of said first-named conveyer for periodically operating the depositing means, and means driven by said operating means and operating independently of the driving means of the second conveyer to assure registration of said trays successively with said depositing means simultaneously with the operation of the latter.

7. In a machine for the purpose described, a conveyer, driving means therefor, a second conveyer including trays, driving means therefor, means for removing biscuit from said first named conveyer and depositing the same upon said second conveyer, means timed with the drive of said first-named conveyer for periodically operating the depositing means, and means including a member driven by said operating means, engaging the second conveyer and operating independently thereof to assure registration of said trays successively with said depositing means simultaneously with the operation of the latter.

8. In a machine for the purpose described, a conveyer, driving means therefor, a second conveyer including trays, driving means therefor, a portion of said second conveyer being adapted for movement independent of its driving means, means for removing biscuit from said first named conveyer and depositing the same upon said second conveyer, means timed with the drive of said first-named conveyer for periodically operating the depositing means, and means driven by said operating means and engaging said independently movable portion for assuring registration of said trays successively with said depositing means simultaneously with the operation of the latter.

9. In a machine for the purpose described, a conveyer, driving means therefor, a chain conveyer, trays mounted thereon, driving means therefor, a portion of said chain conveyer being adapted for movement independent of its driving means, means for removing biscuit from said first named conveyer and depositing the same upon said chain conveyer, means timed with the drive of said first named conveyer for periodically operating the depositing means, and means including a sprocket driven by said operating means and engaging said independently movable portion for assuring registration of said trays successively with said depositing means simultaneously with the operation of the latter.

10. In a machine for the purpose described, a conveyer, driving means therefor, a chain conveyer having a portion movable over sprockets mounted in a pivoted frame, trays mounted on said chain conveyer, means for removing biscuit from said first named conveyer and depositing the same upon said chain conveyer, means timed with the drive of the first named conveyer for periodically operating the depositing means, and means including a sprocket driven by said operating means and engaging the pivotally carried portion of said chain conveyer for assuring registration of said trays successively with said depositing means simultaneously with the operation of the latter.

11. In a machine for the purpose described, a conveyer, driving means therefor, a second conveyer including trays, driving means therefor, means for removing longitudinal rows of biscuit from said first named conveyer and depositing the same upon and transversely of said second conveyer, means timed with the drive of said first named conveyer for periodically operating the depositing means, and means driven by said operating means and operating independently of the driving means of the second conveyer to assure registration of said trays successively with said depositing means simultaneously with the operation of the latter.

12. In a machine for the purpose described, a chain conveyer including carrier links, driving means therefor, a second chain conveyer including carrier links and having a path of movement designed to bring said links adjacent the links of the first named conveyer, independent driving means for said second conveyer, and means having operating connection with the driving means of one conveyer for regulating the movement of the adjacent links of the other conveyer.

13. In a machine for the purpose described, a chain conveyer including carrier links, driving means therefor, a second chain conveyer including carrier links, independent driving means therefor, a portion of said second conveyer being adapted to permit movement of the links independent of its driving means, and means having operating connection with the driving means of said first named conveyer and engaging the independently movable portion of the second conveyer to regulate the movement of the links thereof.

14. In a machine for the purpose described, a chain conveyer including carrier links, driving means therefor, a second chain conveyer including carrier links, independent driving means therefor, a portion of said second conveyer being adapted to permit movement of the links independent of its driving means, and means including a sprocket driven by the driving means of said first named conveyer and engaging the independently movable portion of the second conveyer to regulate the movement of the links thereof.

15. In a machine for the purpose described, a chain conveyer including carrier links, driving means therefor, a second chain conveyer including carrier links and having a portion movable over sprockets mounted in a pivoted frame, independent driving means for said second conveyer, and means including a sprocket driven by the driving means of said first named conveyer and engaging the pivotally carried portion of said second conveyer to regulate the movement of the links thereof.

In testimony whereof we affix our signatures.

GEORGE M. ANDERSON.
STUART HILDER.